(12) United States Patent
Lin et al.

(10) Patent No.: US 12,502,361 B2
(45) Date of Patent: Dec. 23, 2025

(54) METHOD FOR TREATING DENGUE VIRUS INFECTION

(71) Applicant: CHI MEI MEDICAL CENTER, Tainan (TW)

(72) Inventors: Chiou-Feng Lin, Tainan (TW); Chung-Hsi Hsing, Taipei (TW)

(73) Assignee: CHI MEI MEDICAL CENTER, Tainan (TW)

( * ) Notice: Subject to any disclaimer, the term of this patent is extended or adjusted under 35 U.S.C. 154(b) by 0 days.

(21) Appl. No.: 17/492,469

(22) Filed: Oct. 1, 2021

(65) Prior Publication Data

US 2023/0106048 A1     Apr. 6, 2023

(51) Int. Cl.
*A61K 31/05*     (2006.01)
*A61P 31/14*     (2006.01)

(52) U.S. Cl.
CPC .............. *A61K 31/05* (2013.01); *A61P 31/14* (2018.01)

(58) Field of Classification Search
None
See application file for complete search history.

(56) References Cited

FOREIGN PATENT DOCUMENTS

| | | |
|---|---|---|
| CN | 102946876 A | 2/2013 |
| EP | 2590637 A1 | 5/2013 |

OTHER PUBLICATIONS

Wang et al. Journal of Gastroenterology and Hepatology, 1990, 5, 664-668 (Year: 1990).*
Stogiannou et al. Acta Gastro-Enterologica Belgica 2018, LXXXI, 520-524 (Year: 2018).*
Langley et al. Drugs 1988, 35, 334-372 (Year: 1988).*
Shen et al. J Immunol Research, vol. 2021, 8 pages (Year: 2021).*
Wozniak et al. J. Transl. Med. 2015, 13, 170 (Year: 2015).*
Anderson, Stacy L. et al., "The immune response to anesthesia: Part 2 sedatives, opioids, and injectable anesthetic agents," Vet. Anaesthesia & Analgesia, (2014), 14 pages.
Angelini, Giuditta, MD et al., "Use of Propofol and other Nonbenzodiazepine Sedatives in the Intensive Care Unit," Critical Care Clinics, (Oct. 2001), vol. 17, No. 4, pp. 863-880.
Apan, Teoman Zafer MD PhD, et al., "Antibacterial activity of remifentanil and mixtures of remifentanil and propofol," J Clinical Anesthesia, (2007), vol. 19, pp. 346-350.

Begec, Zekine et al., "The antimicrobial effects of ketamine combined with propofol: An in vitro study," Rev. Bras. Anestesiol., (2013), 63(6): 461-465.
Chen, Hsuen-Chin et al., "Both Virus and Tumor Necrosis Factor Alpha Are Critical for Endothelium Damage in a Mouse Model of Dengue Virus-Induced Hemorrhage," J Virol., Jun. 2007, vol. 81, No. 11, pp. 5518-5526.
Cheng, Yi-Lin et al., "Activation of Nrf2 by the dengue virus causes an increase in CLEC5A, which enhances TNF-α production by mononuclear phagocytes," Scientific Reports, Aug. 2016, 6:32000 (15 pages).
Dept. of Neurological Science, University of Liverpool, "Dengue and Other Emerging Flaviviruses," J of Infection, (2001), vol. 42, pp. 104-115.
Helmy, S.A.K. and Al-Attiyah, R.J., " The immunomodulatory effects of prolonged intravenous infusion of propofol versus midazolam in critically ill surgical patients," Anaesthesia, (2001), vol. 56, pp. 4-8.
Jhan, Ming-Kai, et al., "Anti-TNF-? restricts dengue virus-induced neuropathy," J Leukocyte Biol, (2018), 104: 961.968.
Kao, Jo-Chi et al., "The antiparasitic drug niclosamide inhibits dengue virus infection by interfering with endosomal acidification independent of mTOR," PLOS Neglected Tropical Diseases, Aug. 20, 2018, 16 pages.
Peng, Xiaowei et al., "Propofol Attenuates Hypoxia-Induced Inflammation in BV2 Microglia by Inhibiting Oxidative Stress and NF-κBHif1α Signaling," BioMed Research International, Apr. 2020, vol. 2020, 11 pages.
Shen, Ting-Jing et al., "Antiviral Efficacy of the Anesthetic Propofol against Dengue Virus Infection and Cellular Inflammation," J Immun Research, vol. 2021, Art. ID No. 6680913, 8 pgs.
Stanaway, Jeffrey D. et al., "The Global Burden of Dengue: an analysis from the Global Burden of Disease Study 2013," Lancet Infect Dis, (Jun. 2016), 16(6): 712-723.
Wu, Gong-Jhe et al., "Sepsis-induced liver dysfunction was ameliorated by propofol via suppressing hepatic lipid peroxidation, inflammation, and drug interactions," Life Sciences, (2018), pp. 279-286.
Fang, CY, et al., "Honokiol, a lignan biphenol derived from the Magnolia tree, inhibits dengue virus type 2 infection", Viruses, 7, MDPI, 2015: 4894~4910. DOI: 10.3390/v7092852.
Office Action and Search Report issued on Oct. 26, 2022, in related Taiwan Patent Application No. 110136794. English translation of Search Report included.

* cited by examiner

*Primary Examiner* — Matthew P Coughlin
(74) *Attorney, Agent, or Firm* — PROSYLA GROUP PC

(57) ABSTRACT

The present disclosure provides a method for ameliorating and/or treating dengue virus infection or symptoms of dengue virus infection comprising administrating a pharmaceutical composition to the subject, wherein the pharmaceutical composition comprises an effective amount of 2,6-diisopropylphenol and optionally a pharmaceutically acceptable carrier.

6 Claims, 4 Drawing Sheets

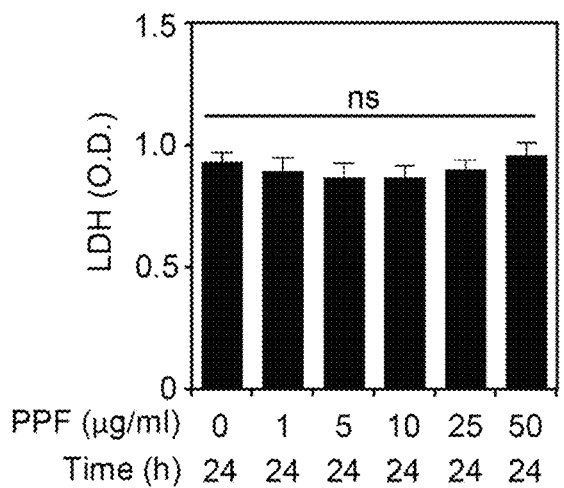
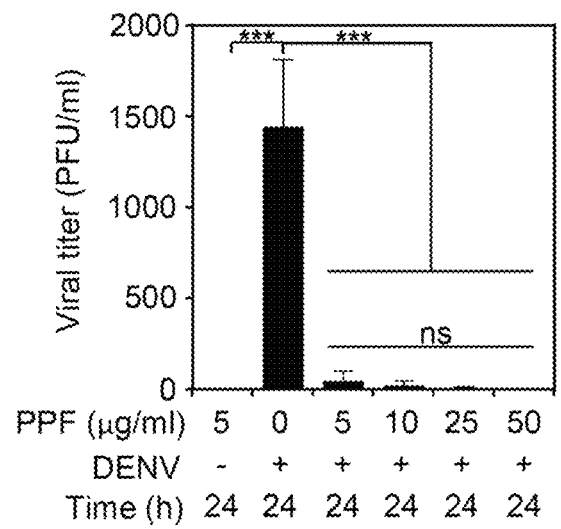
Fig. 1A　　　Fig. 1B
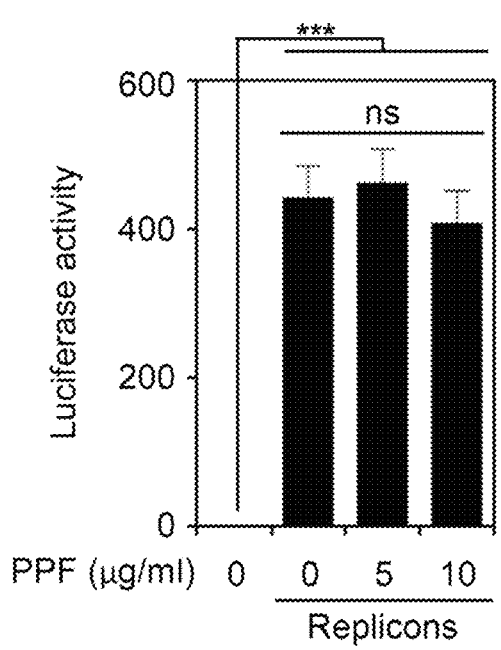
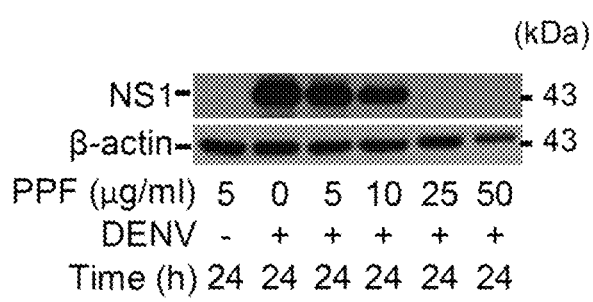
Fig. 2A　　　Fig. 2B

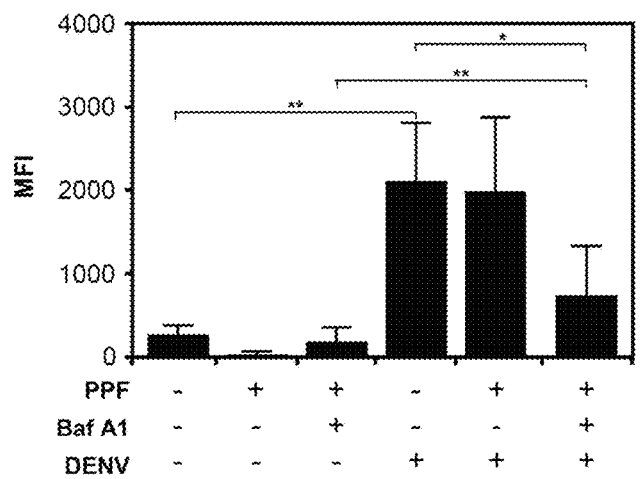
Fig. 4B
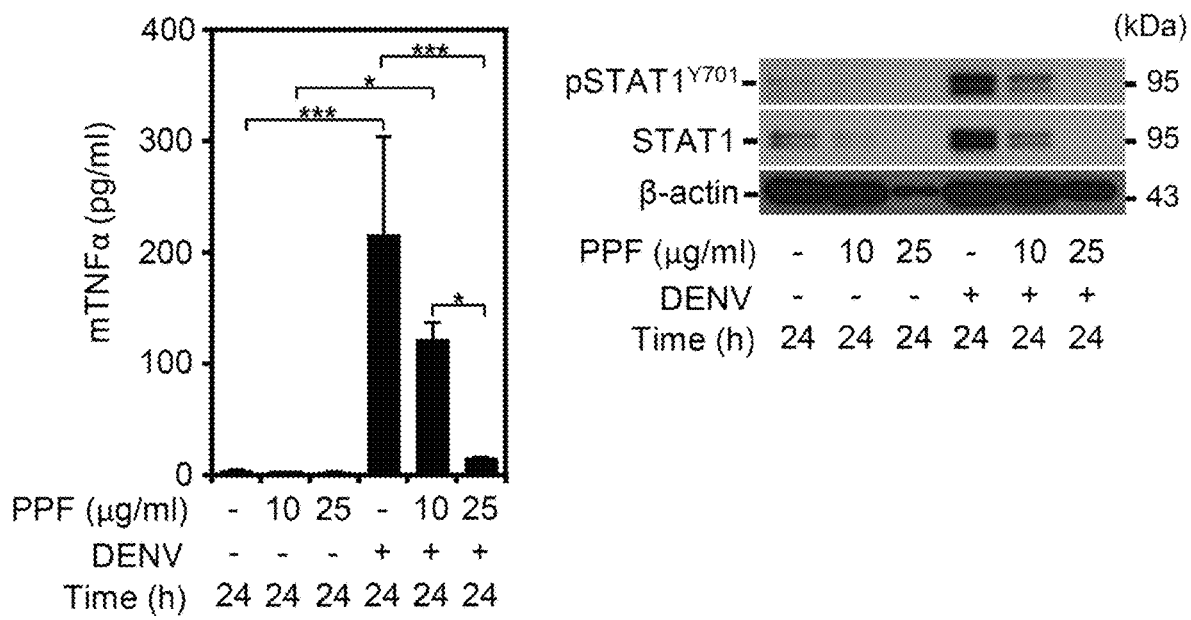
Fig. 5A
Fig. 5B

METHOD FOR TREATING DENGUE VIRUS INFECTION

FIELD OF THE DISCLOSURE

The present disclosure relates to treatment of viral infection. In particular, the present disclosure relates to a method for treating dengue virus infection.

BACKGROUND OF THE DISCLOSURE

Dengue, an arthropod-borne viral disease, is caused by the dengue virus (DENV), a flavivirus transmitted by *Aedes* mosquitoes (Solomon et al., *J Infect*, 42, 2001, 104-115). Globally, infection with DENV affects more than 100 countries, with an estimated 400 million new infections and 25,000 deaths annually (Stanaway et al., *Lancet Infect Dis*, 16, 2016, 712-723). Clinical presentations of DENV infection range from mild dengue fever to severe dengue diseases, including dengue hemorrhagic fever/dengue shock syndrome (DHF/DSS) and multiorgan involvement. Without appropriate medication, severe dengue has a mortality rate ranging from 5 to 20%.

The anesthetic propofol, 2,6-diisopropylphenol, is routinely used in the short term to provide a rapid onset and offset of sedation in critically ill patients under intensive care (Angelini et al., *Crit Care Clin*, 17, 2001, 863-880). Treatment with propofol confers a range of pharmacodynamic effects from amnestic, muscle relaxant, and hypnotic effects to anesthesia. In addition to its neuropharmacological properties, propofol has immunomodulating actions through its negative regulation of pro-inflammatory cytokine/chemokine production and immune cell activation (Helmy et al., *Anaesthesia*, 56, 2001, 4-8; Anderson et al., *Vet Anaesth Analg*, 41, 2014, 553-566). Additionally, general anesthetics, including propofol, remifentanil, and ketamine, exert antimicrobial and microbial growth-promoting effects against bacterial infection (Begec et al., *Braz J Anesthesiol*, 63, 2013, 461-465; Apan et al., J Clin Anesth, 19, 2007, 346-350). EP2590637A1 also discloses an application of propofol as an antiviral medication for preventing and treating infections caused by influenza A viruses. However, none of the prior arts disclose pharmacological effects on viral infection except family Orthomyxoviridae.

Due to its emerging disease status, anti-DENV drugs are essential for dengue treatment.

SUMMARY OF THE INVENTION

The present disclosure provides a method for ameliorating and/or treating dengue virus infection or symptoms of dengue virus infection in a subject in need of such amelioration and/or treatment, comprising administrating a pharmaceutical composition to the subject, wherein the pharmaceutical composition comprises an effective amount of 2,6-diisopropylphenol and optionally a pharmaceutically acceptable carrier.

Furthermore, in some embodiments of the disclosure, 2,6-diisopropylphenol is the sole antiviral active ingredient administrated.

In some embodiments of the disclosure, the dengue virus infection or symptoms of dengue virus infection are ameliorated and/or treated through inhibiting dengue virus release. In another aspect, in some embodiments of the disclosure, the dengue virus infection or symptoms of dengue virus infection are ameliorated and/or treated through blocking dengue protein expression.

Examples of the symptoms of dengue virus infection include but are not limited to sudden onset of inflammation, fever, high fever, muscle and joint pains, headache, vomiting, diarrhea, occurrence of a rash, petechiae, bleeding from the mucous membranes, low white blood cell count, low platelets, metabolic acidosis, elevated level of aminotransferase from the liver, plasma leakage resulting in hemoconcentration and hypoalbuminemia, fluid accumulation in the chest and abdominal cavity, gastrointestinal bleeding, shock, hemorrhage, positive tourniquet test, hypotension, infection of the brain or heart, impairment of vital organs, transverse myelitis, and/or combinations thereof. Furthermore, in some embodiments of the disclosure, the method is for reducing TNF-α or antiviral STAT1 signaling.

The administration route of the pharmaceutical composition as described herein may vary. In some embodiments of the disclosure, the pharmaceutical composition is formulated for parenteral administration. Particularly, the pharmaceutical composition is formulated for intravenous administration.

The present disclosure provides a method for inhibiting dengue virus release comprising contacting the dengue virus with 2,6-diisopropylphenol.

In some embodiments of the disclosure, the method is further for blocking dengue protein expression.

In some embodiments of the disclosure, the method for inhibiting dengue virus release is further for inhibiting dengue virus release in a subject in need of such inhibition, comprising administrating a pharmaceutical composition to the subject, wherein the pharmaceutical composition comprises an effective amount of 2,6-diisopropylphenol and optionally a pharmaceutically acceptable carrier.

The present disclosure provides a method for blocking dengue protein expression comprising contacting the dengue virus with 2,6-diisopropylphenol.

In some embodiments of the disclosure, the method for blocking dengue protein expression is further for blocking dengue protein expression in a subject in need of such inhibition, comprising administrating a pharmaceutical composition to the subject, wherein the pharmaceutical composition comprises an effective amount of 2,6-diisopropylphenol and optionally a pharmaceutically acceptable carrier.

BRIEF DESCRIPTION OF THE DRAWINGS

FIGS. 1A and 1B show that propofol treatment inhibits DENV virion production. FIG. 1A shows that the LDH assay showed the cytotoxicity of BHK-21 cells cultured in a medium containing propofol for 24 h. FIG. 1B shows that plaque assay determined the viral titer in BHK-21 cells pretreated with propofol for 1 h followed by DENV2 (MOI=1) infection for 24 h. Quantitative data are presented as the mean±SD of at least three independent experiments (n=3). ***$p<0.001$. ns, not significant.

FIGS. 2A and 2B show that propofol treatment reduces DENV viral NS1 protein expression but does not affect viral protein translation. FIG. 2A shows that luciferase activities of BHK-21 cells and replicons treated with or without propofol were used to determine viral protein translation. FIG. 2B shows that western blot analysis showed viral NS1 protein expression in BHK-21 cells pretreated with propofol for 1 h and then infected with DENV2 (MOI=1) for 24 h. Quantitative data are presented as the mean±SD of at least three independent experiments (n=3). ***$p<0.001$. ns, not significant.

FIGS. 4A and 4B show that propofol treatment has no blocking effect on viral dsRNA replication during DENV infection. FIG. 4A shows that images of immunocytochemistry staining showed viral dsRNA expression 6 h post-infection in mock- and DENV2-infected BHK-21 cells pretreated with or without Baf A1 and propofol for 1 h. DAPI was used to label nuclear DNA. FIG. 4B shows statistical analysis of the staining presented as mean fluorescent intensity (MFI). Quantitative data are presented as the mean±SD of the experiments (n=3). *p<0.05;**p<0.01. Scale bar: 100 μm.

FIGS. 5A and 5B show that propofol treatment reduces pro-inflammatory TNF-α production and type I IFN signaling. RAW 264.7 cells were pretreated without or with propofol (10 or 25 μg/ml) followed by infection with DENV2 (MOI=10) for 24 h. FIG. 5A shows the ELISA analysis determined mouse TNF-α production. FIG. 5B shows that western blot analysis showed protein expressions of phospho-STAT1 and STAT1. Quantitative data are presented as the mean±SD of the experiments (n=3). *p<0.05; ***p<0.001.

DETAILED DESCRIPTION OF THE INVENTION

Figure 3:
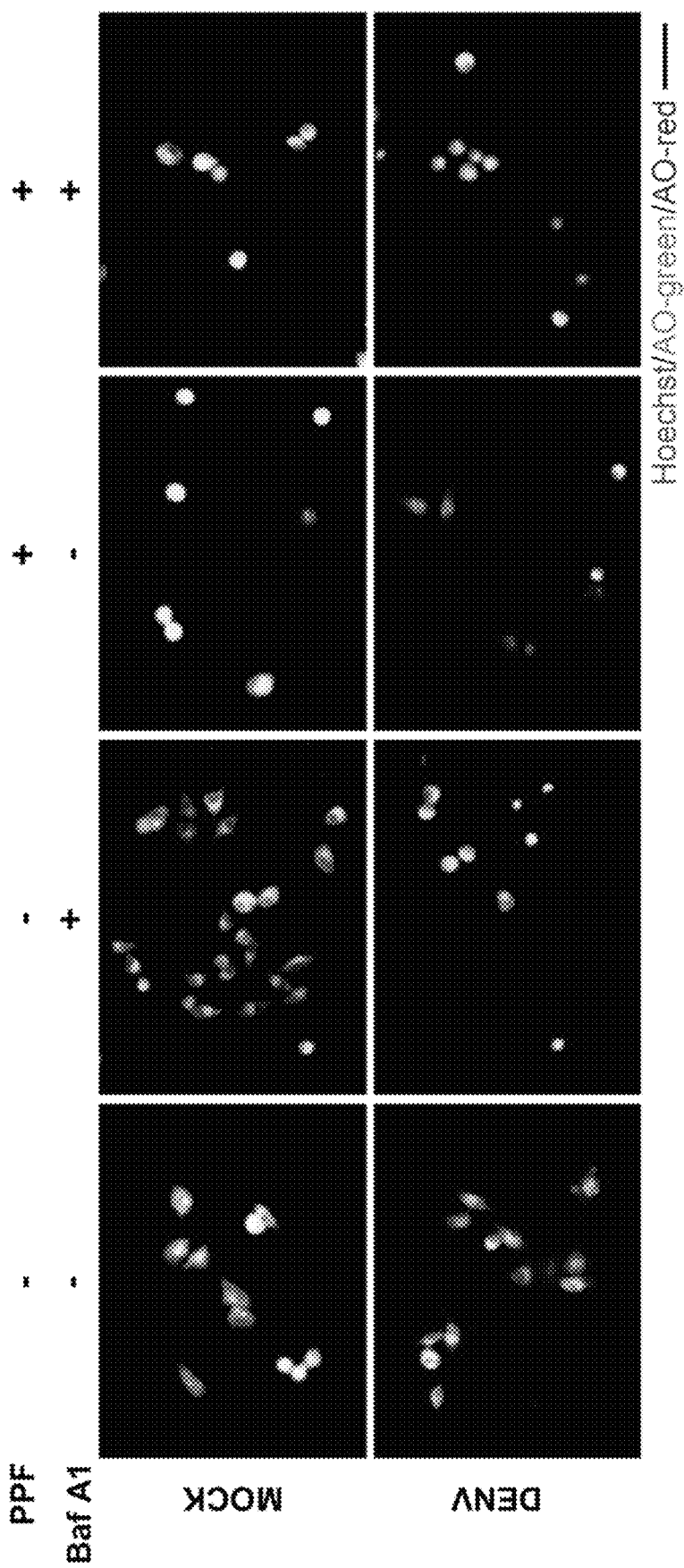
FIG. 3 shows that propofol treatment does not affect endosomal acidification during DENV infection. The fluorescent images of acridine orange-stained BHK-21 cells pretreated with or without Baf A1 and propofol for 1 h showed endosomal acidification during mock and DENV infection for 2 h. Hoechst was used to label nuclear DNA. Scale bar: 100 μm.

Unless defined otherwise, all scientific or technical terms used herein have the same meaning as those understood by persons of ordinary skill in the art to which the present invention belongs. Any method or material similar or equivalent to those described herein can be understood and used by those of ordinary skill in the art to practice the present invention.

It must be noted that, as used in the specification and the appended claims, the singular forms "a," "an" and "the" include plural referents unless the context clearly dictates otherwise. Thus, unless otherwise required by context, singular terms shall include the plural and plural terms shall include the singular.

As used herein, the term "optional" or "optionally" means that the subsequently described event or circumstance may or may not occur, and that the description includes instances where the said event or circumstance occurs and instances where it does not. For example, the phrase "optionally comprising an agent" means that the agent may or may not exist.

The term "and/or" is used to refer to both things or either one of the two mentioned.

The terms "treatment," "treating," and "treat" generally refer to obtaining a desired pharmacological and/or physiological effect. The effect maybe preventive in terms of completely or partially preventing a disease, disorder, or symptom thereof, and may be therapeutic in terms of a partial or complete cure for a disease, disorder, and/or symptoms attributed thereto. "Treatment" used herein covers any treatment of a disease in a mammal, preferably a human, and includes (1) suppressing development of a disease, disorder, or symptom thereof in a subject or (2) relieving or ameliorating the disease, disorder, or symptom thereof in a subject.

As used herein, the term "dengue virus" refers to members of the Flaviviridae family of enveloped viruses with a single-stranded positive-sense RNA genome. The term "dengue virus" may include any serotype of dengue virus, such as serotypes 1-4, which is capable of causing disease in an animal or human subject. In particular, the term encompasses any subtype of dengue virus that causes disease in humans, including strains DEN 1 Hawaii 1944, Den 2 New Guinea C strain, DEN 3 strain H87, and DEN 4 strain H241.

As used herein, the term "infection" refers to a series of processes from the adsorption of viruses onto the cell surface of host cells in which the viruses then grow, to extracellular release (in the case of a naked capsid having no envelope) or budding (in the case of a capsid having an envelope, i.e., an enveloped particle described later) during the life cycle of a virus.

As used herein, the term "subject" is any animal that can benefit from the administration of a compound or composition as disclosed herein. For example, the animal may be a human, dog, sheep, cow, goat, horse, hen, duck, goose, pig or rodent. Typically, the animal is a human.

As used herein, the term "in need of treatment" refers to a judgment made by a caregiver (e.g., physician, nurse, nurse practitioner, or individual in the case of humans; veterinarian in the case of animals, including non-human mammals), and such judgment is that a subject requires or will benefit from treatment. This judgment is made based on a variety of factors that are in the realm of a care giver's expertise, but that include the knowledge that the subject is ill, or will be ill, as the result of a condition that is treatable by the compounds of the present disclosure.

The term "administering" includes routes of administration which allow the active ingredients of the disclosure to perform their intended function.

As used in the present invention, the term "pharmaceutical composition" means a mixture containing a therapeutic agent administered to an animal, for example a human, for treating or eliminating a particular disease or pathological condition that the animal suffers.

The term "effective amount" of an active ingredient as provided herein means a sufficient amount of the ingredient to provide the desired regulation of a desired function. As will be pointed out below, the exact amount required will vary from subject to subject, depending on the disease state, physical conditions, age, sex, species and weight of the subject, the specific identity and formulation of the composition, etc. Dosage regimens may be adjusted to induce the optimum therapeutic response. For example, several divided doses may be administered daily or the dose may be proportionally reduced as indicated by the exigencies of the therapeutic situation. Thus, it is not possible to specify an exact "effective amount." However, an appropriate effective amount can be determined by one of ordinary skill in the art using only routine experimentation.

The term "pharmaceutically acceptable" as used herein refers to compounds, materials, compositions, and/or dosage forms which are, within the scope of sound medical judgment, suitable for use in contact with the tissues of a subject (either a human or non-human animal) without excessive toxicity, irritation, allergic response, or other problem or complication, commensurate with a reasonable benefit/risk ratio. Each carrier, excipient, etc. must also be "acceptable" in the sense of being compatible with the other ingredients of the formulation. Suitable carriers, excipients, etc. can be found in standard pharmaceutical texts.

The present disclosure provides a method for ameliorating and/or treating dengue virus infection or symptoms of dengue virus infection in a subject in need of such amelioration and/or treatment comprising administrating a pharmaceutical composition to the subject, wherein the pharmaceutical composition comprises an effective amount of 2,6-diisopropylphenol and optionally a pharmaceutically acceptable carrier.

2,6-diisopropylphenol (propofol) is a short-acting intravenous sedative agent used in adults and children. The present disclosure describes effects of propofol on dengue virus infection and replication and dengue virus infection-induced cellular inflammation. According to the disclosure, dengue virus infection or symptoms of dengue virus infection are treated using predominantly or solely 2,6-diisopropylphenol as the antiviral active ingredient.

According to the disclosure, the degradation of propofol in the pharmaceutical composition can be essentially eliminated through proper formulation, manufacturing and packaging. The effects of antioxidants, presence of oxygen, pH and buffer species on the stability of propofol have all been evaluated in controlled testing under real time and accelerated conditions. In some embodiments of the disclosure, the pharmaceutical composition is in a form of liquid formulation including an emulsion-type formulation or emulsion-type formulation. Suitable solubility enhancing agents include one or more organic solvents, detergents, soaps, surfactant and other organic compounds typically used in parenteral formulations to enhance the solubility of a particular agent. In some embodiments of the disclosure, propofol is an emulsion of soybean oil, glycerol, and egg lecithin.

The pharmaceutical composition described herein can be pharmaceutically acceptable compositions, which may include one or more pharmaceutically acceptable carriers, excipients, binders, diluents or the like. The instant compositions can be formulated for various routes of administration, for example, oral administration. They also may be provided in combination with delivery vehicles such as in some encapsulating technology.

In some embodiments of the disclosure, the pharmaceutical composition is suitable for parenteral administration. Parenteral routes of administration enable total systemic availability and fastest onset of action. The most commonly used parenteral routes are intravenous (i.v.), intramuscular (i.m.), and subcutaneous (s.c.). Intravenous injection offers rapid onset of anesthesia, which is the typical route of administration of propofol, although consecutive drip administration of propofol (constant infusion) is also used to maintain constant drug levels in patients in need thereof (e.g., continued anesthesia or mild sedation).

The propofol is generally present in amounts ranging from about 0.1% to 5% by weight or more preferably 1% to 2% by wt. of propofol based upon the total weight of the pharmaceutical composition.

The dosage regimen utilizing the compounds is selected in accordance with a variety of factors including type, species, age, weight, sex and medical condition of the patient; the severity of the condition to be treated; the route of administration; the renal and hepatic function of the patient; and the particular compound or salt thereof employed. An ordinarily skilled physician or veterinarian can readily determine and prescribe the effective amount of the drug required to prevent, counter, or arrest the progress of the condition. In some embodiments of the disclosure, dosage levels of propofol are about 0.3 to about 12, about 0.5 to about 11.5, about 0.8 to about 11, about 1.0 to about 10.5, about 1.2 to about 10, about 1.5 to about 9.5, about 2.0 to about 9, about 2.5 to about 8.5, about 3.0 to about 8, about 3.5 to about 7.5, about 4 to about 7, about 4.5 to about 6.5, about 5 to about 6 mg/kg.

According to the disclosure, treatment with propofol significantly inhibits dengue virus release after infection. Furthermore, treatment with propofol also blocks viral protein expression independent of the translational blockade.

In some embodiments of the disclosure, the method for inhibiting dengue virus release is further for inhibiting dengue virus release in a subject in need of such inhibition, comprising administrating a pharmaceutical composition to the subject, wherein the pharmaceutical composition comprises an effective amount of 2,6-diisopropylphenol and optionally a pharmaceutically acceptable carrier.

In some embodiments of the disclosure, the method for blocking dengue protein expression is further for blocking dengue protein expression in a subject in need of such inhibition, comprising administrating a pharmaceutical composition to the subject, wherein the pharmaceutical composition comprises an effective amount of 2,6-diisopropylphenol and optionally a pharmaceutically acceptable carrier.

By treating dengue virus infection, inhibiting dengue virus release, or blocking viral protein expression with 2,6-diisopropylphenol, the symptoms of dengue virus infection are able to be treated simultaneously. According to the present invention, "symptoms are treated" when one or more symptoms of a particular disease, disorder or condition are reduced in magnitude (e.g., intensity, severity, etc.) or frequency. For purposes of clarity, a delay in the onset of a particular symptom is considered one form of reducing the frequency of that symptom. To give but a few examples, exemplary symptoms of dengue virus include but are not limited to sudden onset of fever, high fever (often over 40° C.), muscle and joint pains, headache, vomiting, diarrhea, occurrence of a rash as flushed skin or measles-like rash, petechiae (small red spots caused by broken capillaries that do not disappear when skin is pressed), bleeding from the mucous membranes, low white blood cell count, low platelets, metabolic acidosis, elevated level of aminotransferase from the liver, plasma leakage resulting in hemoconcentration (indicated by a rising hematocrit) and hypoalbuminemia, fluid accumulation in the chest and abdominal cavity (e.g., pleural effusion or ascites), gastrointestinal bleeding, shock and hemorrhage, positive tourniquet test, hypotension, infection of the brain or heart, impairment of vital organs (e.g., liver), neurological disorders such as transverse myelitis, and/or combinations thereof. It is not intended that the present disclosure be limited only to cases where the symptoms are eliminated. The present disclosure specifically contemplates treatment such that one or more symptoms are reduced (and the condition of the subject is thereby "improved"), albeit not completely eliminated.

According to the disclosure, either the pro-inflammatory TNF-α or the antiviral STAT1 signaling is reduced by propofol treatment. These results provide evidence to show the potential antiviral effects of the sedative propofol against dengue virus infection and cellular inflammation.

Although disclosure has been provided in some detail by way of illustration and example for the purposes of clarity of understanding, it will be apparent to those skilled in the art that various changes and modifications can be practiced without departing from the spirit or scope of the disclosure. Accordingly, the foregoing descriptions and examples should not be construed as limiting.

EXAMPLES

Methods and Materials

Cells and Virus

Baby hamster kidney (BHK)-21 fibroblasts (ATCC, CCL10) were maintained in Dulbecco's modified Eagle's medium (DMEM; Thermo Fisher Scientific) containing 10% heat-inactivated fetal bovine serum (FBS, Biological Industries) and 1% penicillin-streptomycin (Thermo Fisher Scientific) at 37° C. in 5% $CO_2$. BHK-21 cells harboring a luciferase-expressing DENV replicon (BHK-D2-Fluc-SGR-Neo-1) were maintained in DMEM with 10% heat-inactivated FBS, 1% penicillin-streptomycin, and 0.4 mg/ml G418 agent (Cat# A1720, Sigma-Aldrich) at 37° C. in 5% $CO_2$. The *Aedes albopictus* clone mosquito C6/36 cells (ATCC, CRL1660) were maintained in Minimum Essential Medium (MEM; Thermo Fisher Scientific) containing 10% heat-inactivated FBS, 1% penicillin-streptomycin (Thermo Fisher Scientific), 1% sodium pyruvate (Cat#11360-070, Thermo Fisher Scientific), 1% 4-(2-hydroxyethyl) piperazineethanesulfonic acid (HEPES; Cat#15630-080, Thermo Fisher Scientific) and 1% nonessential amino acids (NEAA; Cat#11140-035, Thermo Fisher Scientific) at 28° C. in 5% $CO_2$. Dengue virus serotype 2 (DENV2, strain PL046) was obtained from Center Disease Control in Taiwan and propagated in a C6/36 cell monolayer at a multiplicity of infection (MOI) of 0.01. After incubation (28° C. in 5% $CO_2$) for 5 days, the viral supernatants were collected and filtered with a 0.22 μm filter and then stored at −80° C. until use. Viral titers were determined by plaque assay using BHK-21 cells.

Agents and Antibodies

Propofol (2,6-diisopropylphenol) was purchased from Sigma-Aldrich (St. Louis, MO, USA). An antibody against DENV NS1 (Cat# GTX124280) was purchased from GeneTex (San Antonio, TX); antibodies against phospho-STAT1$^{Tyr701}$ (Cat#9167; clone 58D6), STAT1 (Cat#9172), horseradish peroxidase (HRP)-conjugated goat anti-rabbit IgG (Cat#7074S), and HRP-conjugated horse anti-mouse IgG (Cat#7076S) were purchased from Cell Signaling Technology (Beverly, MA); Alexa Flour 488-conjugated goat anti-mouse antibody (Cat# A-11029) and Hoechst 33258 (Cat# H3569) were purchased from Thermo Fisher Scientific (Pittsburgh, PA, USA); antibody against dsRNA (Cat#10010200) was purchased from SCICONS; antibody against mouse (3-actin (Cat# A5441), 4,6-diamidino-2-phenylindole (DAPI; Cat# D9542), the V-ATPase inhibitor bafilomycin A1 (Baf A1; Cat#19-148), and acridine orange hemi (zinc chloride) salt (Cat# A6014) were purchased from Sigma-Aldrich (St. Louis, MO). According to the manufacturer's instructions, cell cytotoxicity was assessed using Cytotoxicity Detection Kit assays (Roche Diagnostics, Lewes, UK).

Western Blotting

Cells were collected and extracted with lysis buffer containing a protease inhibitor cocktail (Sigma-Aldrich). The processed proteins were separated by 10% SDS polyacrylamide gel electrophoresis followed by transfer to a polyvinylidene difluoride (PVDF) membrane (Millipore). Then, the PVDF membrane was blocked with 5% nonfat milk in 0.05% Tween-20-containing Tris-buffer-based saline (TBS-T) at room temperature for 1 h. Next, the membrane was washed three times with TBS-T buffer and immunohybridized with the indicated primary antibodies at 4° C. overnight. Then, the membrane was washed with TBS-T buffer three times, followed by incubation with the indicated HRP-conjugated secondary antibodies at room temperature for 1 h. The antibody-protein complexes on the PVDF membrane were detected using an ECL Western blot detection kit (PerkinElmer). The signals of the identified proteins were captured with a film exposure system.

Plaque Assay

BHK-21 cells were grown in a monolayer in a 12-well plate at $7 \times 10^4$ cells/well. Serially diluted viral solutions were added to infect cells for 2 h and then replaced with fresh DMEM containing 4% FBS and 0.5% methylcellulose (Sigma-Aldrich) for 5 days. Next, wells were washed with 2 ml PBS twice and stained with crystal violet solution containing 1% crystal violet (Sigma-Aldrich), 0.64% NaCl, and 2% paraformaldehyde (Sigma-Aldrich) overnight. Subsequently, wells were washed with water and air-dried to count the number of plaque-forming units (PFU).

Reporter Assay

BHK-D2-Fluc-SGR-Neo-1 cells (replicons) were seeded in 96-well plates at 3,000 cells/well overnight. After the treatments, luciferase activity was detected using the Dual-Glo® Luciferase Assay System (Cat# E2940, Promega) and a spectral scanning multimode reader (Thermo Varioskan Flash).

Double-Strain RNA Staining

Cells were washed with ice-cold PBS 3 times and fixed with 4% paraformaldehyde (Sigma-Aldrich) at room temperature for 15 minutes. Then, the cells were washed 3 times with ice-cold PBS and permeabilized with permeabilization buffer (PBS containing 1% Triton X-100) at room temperature for 5 minutes. The cells were then washed 3 times with ice-cold PBS and immunoblocked with blocking buffer (PBS containing 1% BSA and 0.01% Triton X-100) at 4° C. for 30 minutes. Next, the cells were washed 3 times with ice-cold PBS and immunohybridized with mouse anti-dsRNA J2 primary antibody at 4° C. overnight. Subsequently, the cells were washed 3 times with ice-cold PBS and stained with Alexa Fluor 488-conjugated goat anti-mouse antibody (Thermo Fisher Scientific) at room temperature for 15 minutes. The cells were washed 3 times with ice-cold PBS and then visualized with fluorescence or confocal microscopy. DAPI (Sigma-Aldrich) was used for nuclear staining.

Acridine Orange Staining

Cells were washed with HBSS (Thermo Fisher Scientific) once and then stained with acridine orange agent (Sigma-Aldrich) and Hoechst 33258 (Thermo Fisher Scientific) in an incubator at 37° C. in 5% $CO_2$. After 45 minutes, the cells were washed with HBSS once and rinsed with HBSS. Subsequently, cells were visualized with a fluorescence microscope (EVOS). Hoechst 33258 was used for nuclear staining.

Enzyme-Linked Immunosorbent Assay (ELISA).

According to the manufacturer's instruction, samples were harvested, and the concentration of mouse TNFα was determined using ELISA kit (Cat#88-7324-88, eBioscience).

Statistical Analysis

Experimental data were analyzed using GraphPad Prism (version 8.3.0). One-way ANOVA (Tukey's multiple comparisons test) was used to determine experiments involving numerous groups. Values are means±standard deviation (SD). All p values were obtained from two-tailed significance tests. A p-value of <0.05 was considered statistically significant.

Example 1 Propofol Treatment Inhibits DENV Infection

Here, we examined propofol, a short-term anesthetic, for its antiviral activity. The LDH assay showed that propofol did not cause cytotoxicity at testing dosages ranging from 1 to 50 µg/ml (FIG. 1A). Based on these results, BHK-21 cells were pretreated with propofol for 1 h and then infected with DENV for an additional 24 h. In this DENV infection model, 24 h post-infection showed a significant viral replication as demonstrated by using plaque assay. The results showed that propofol significantly (p<0.001) reduced DENV virion release, as demonstrated by the viral titer, at doses of 5, 10, 25, and 50 µg/ml (FIG. 1B). These results indicate that propofol treatment effectively blocks DENV infection.

Example 2 Propofol Reduces DENV Viral Protein Expression but does not Affect Viral Translation To assess propofol's inhibitory activity on DENV infection, we next used BHK-21-SGR cells, a cellular replicon-based reporter assay, to examine propofol's translational targets. The luciferase activity showed no remarkable difference in replicons treated with or without propofol (FIG. 2A), indicating that a protein translation-independent route mediates the propofol-induced antiviral effect. By western blot analysis, we found that viral NS1 protein expression was effectively increased 24 h post-infection and was decreased in a dose-dependent manner under propofol treatment (FIG. 2B). Overall, propofol inhibits DENV viral protein expression independent of the translational blockade.

Example 3 Propofol does not Affect DENV-Induced Endosomal Acidification

The endosomal acidification step is critical for DENV uncoating to release the viral genome for further replication in the cytoplasm (Solomon et al., *J Infect*, 42, 2001, 104-115). Therefore, the pH-sensitive dye acridine orange (AO) was used to explore whether propofol affects the early stages of DENV infection accordingly (Kao et al., *PLoS Negl Trop Dis*, 12, 2018, e0006715). After a 2-hour infection, images of AO-stained BHK-21 cells showed a low pH in the endosomes (red) of DENV-infected cells compared with mock-infected cells. Cells treated with bafilomycin (Baf) A1, a V-ATPase inhibitor (Kao et al., *PLoS Negl Trop Dis*, 12, 2018, e0006715), were intensely stained green, indicating that endosome acidification was blocked. Notably, cells treated with propofol exhibited a red color attenuated by cotreatment with Baf A1 (FIG. 3). These results reveal that propofol does not affect endosomal acidification during DENV infection.

Figure 4A:
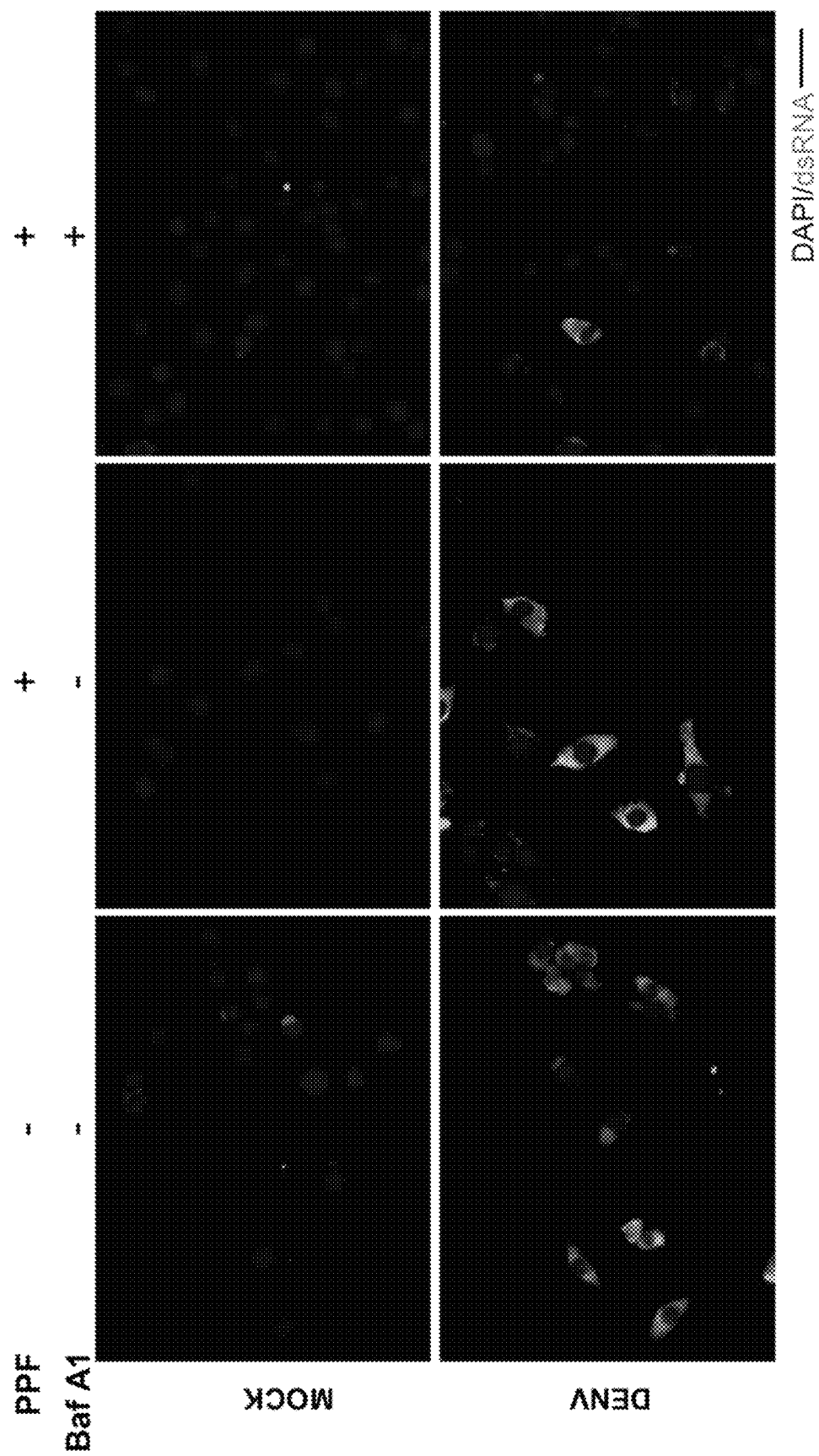

Example 4 Propofol does not Inhibit dsRNA Replication at the Early Infectious Stage Following endocytosis, the viral genome is released into the cytoplasm and undergoes genome replication (Solomon et al., *J Infect*, 42, 2001, 104-115). To investigate propofol's inhibitory effect on viral RNA replication, cells were pretreated with the indicated drugs for 1 h and then infected with DENV for an additional 6 h. Images of dsRNA immunostaining showed that dsRNA expression occurred, as demonstrated by positive staining (green), in both cells treated with or without propofol under DENV infection. However, cells pretreated with Baf A1 as a positive control, then treated with propofol showed reduced dsRNA expression in the infected cells (FIGS. 4A and B). The data demonstrate that propofol does not affect blocking DENV viral dsRNA replication at early infection.

Example 5 Propofol Impedes Pro-Inflammatory Cytokine Responses

DENV infection induces robust cytokine production, such as TNF-α, which is immunopathogenic in vivo and in vitro, to defeat hosts (Jhan et al., *J Leukoc Biol*, 104, 2018, 961-968; Cheng et al., Sci Rep, 6, 2016, 32000; Chen et al., *J Virol*, 81, 2007, 5518-5526). Although propofol is typically used as an anesthetic agent, it also functions to eliminate inflammation. Propofol reduces both the gene and cytokine productions of TNF-α in not only $CoCl_2$-treated hypoxic BV2 microglia but also cecal ligation and puncture-administrated rat liver (Peng et al., *Biomed Res Int*, 2020, 8978704; Wu et al., *Life Sci*, 213, 2018, 279-286). In this study, RAW 264.7 cells were pretreated with or without propofol (10 or 25 µg/ml) followed by infection with DENV for 24 h. ELISA analysis showed DENV infection significantly increased mouse TNF-α production; however, propofol treatment reduced the cytokine levels in a dose-dependent manner (FIG. 5A). Regarding propofol treatment inhibiting DENV replication, it is hypothesized that propofol may enhance antiviral interferon (IFN) responses. The protein expressions of phospho-STAT1 and STAT1, the expected transcription factor of antiviral IFN signaling, were increased following DENV infection but inhibited by propofol treatment (FIG. 5B). Thus, it is suggested that propofol has anti-inflammation activity against DENV-induced cellular inflammation.

While the present disclosure has been described in conjunction with the specific embodiments set forth above, many alternatives thereto and modifications and variations thereof will be apparent to those of ordinary skill in the art. All such alternatives, modifications and variations are regarded as falling within the scope of the present disclosure.

What is claimed is:

1. A method for inhibiting dengue virus release with 2,6-diisopropylphenol in a subject with a symptom of dengue virus infection, wherein the method comprises orally administrating a pharmaceutical composition to the subject, wherein the pharmaceutical composition comprises an effective amount of 2,6-diisopropylphenol and optionally a pharmaceutically acceptable carrier,
   wherein the symptom is selected from a group consisting of sudden onset of fever, high fever, muscle and joint pain, headache, occurrence of a rash, petechiae, bleeding from mucous membranes, low white blood cell count, low platelets, metabolic acidosis, elevated level of aminotransferase from the liver, plasma leakage resulting in hemoconcentration and hypoalbuminemia, fluid accumulation in the chest and abdominal cavity, shock, positive tourniquet test, hypotension, infection of the brain or heart, impairment of vital organs, and transverse myelitis.

2. The method according to claim 1, wherein 2,6-diisopropylphenol is the sole antiviral active ingredient administrated.

3. A method for blocking dengue protein expression in a subject with a symptom of dengue virus infection, wherein the method comprises orally administrating a pharmaceutical composition to the subject, wherein the pharmaceutical composition comprises an effective amount of 2,6-diisopropylphenol and optionally a pharmaceutically acceptable carrier,
   wherein the symptom is selected from a group consisting of sudden onset of fever, high fever, muscle and joint pain, headache, occurrence of a rash, petechiae, bleeding from mucous membranes, low white blood cell count, low platelets, metabolic acidosis, elevated level of aminotransferase from the liver, plasma leakage resulting in hemoconcentration and hypoalbuminemia, fluid accumulation in the chest and abdominal cavity, shock, positive tourniquet test, hypotension, infection of the brain or heart, impairment of vital organs, and transverse myelitis.

4. The method according to claim 3, wherein 2,6-diisopropylphenol is the sole antiviral active ingredient administrated.

5. A method for ameliorating a symptom of dengue virus infection in a human subject with the symptom, wherein the method comprises orally administrating a pharmaceutical composition to the subject, wherein the pharmaceutical composition comprises an effective amount of 2,6-diisopropylphenol and optionally a pharmaceutically acceptable carrier, wherein 2,6-diisopropylphenol is predominantly or solely an antiviral active ingredient in the pharmaceutical composition, and wherein the symptom is selected from a group consisting of sudden onset of fever, high fever, muscle and joint pain, headache, occurrence of a rash, petechiae, bleeding from mucous membranes, low white blood cell count, low platelets, metabolic acidosis, elevated level of aminotransferase from the liver, plasma leakage resulting in hemoconcentration and hypoalbuminemia, fluid accumulation in the chest and abdominal cavity, shock, positive tourniquet test, hypotension, infection of the brain or heart, impairment of vital organs, and transverse myelitis.

6. The method according to claim 5, wherein 2,6-diisopropylphenol is the sole antiviral active ingredient administrated.

* * * * *